United States Patent [19]
Dehnert et al.

[11] Patent Number: 6,059,839
[45] Date of Patent: *May 9, 2000

[54] APPARATUS AND METHOD FOR COMPILER IDENTIFICATION OF ADDRESS DATA

[75] Inventors: James C. Dehnert, Palo Alto; Wingshun Wilson Ho, San Mateo; Seema Hiranandani, Menlo Park, all of Calif.

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/780,784

[22] Filed: Jan. 9, 1997

[51] Int. Cl.[7] .................................................. G06F 9/445
[52] U.S. Cl. ......................... 717/9; 717/4; 717/5; 717/6; 717/7; 717/8; 717/10
[58] Field of Search .................................... 395/707, 708, 395/709, 704, 705, 706, 710

[56] References Cited

U.S. PATENT DOCUMENTS

| | | | |
|---|---|---|---|
| 5,488,727 | 1/1996 | Agrawal et al. | 717/9 |
| 5,493,675 | 2/1996 | Faiman, Jr. et al. | 395/709 |
| 5,535,394 | 7/1996 | Burke et al. | 717/9 |
| 5,659,753 | 8/1997 | Murphy et al. | 395/705 |
| 5,696,974 | 12/1997 | Agrawal et al. | 717/9 |
| 5,812,851 | 9/1998 | Levy et al. | 717/5 |
| 5,838,978 | 11/1998 | Buzbee | 717/5 |

OTHER PUBLICATIONS

IBM Technical Disclosure Bulletin, "Determination of Range of an Entry Variable", vol. 16, No. 1, pp. 362–364. Jun. 1973.

Alfred V. Aho et al, "Compilers, Principles, Techniques, and Tools", Addison–Wesley Publishing Company, pp. 404–446, 513–514, 654–656, 703–711, 1988.

Aho et al., "Compilers, Principles, Techniques, and Tools", Addison–Wesley Publishing, pp. 10–19, 60–62, 389–431, 506–508, 1988.

*Primary Examiner*—Tariq R. Hafiz
*Assistant Examiner*—Ted T. Vo
*Attorney, Agent, or Firm*—Wagner, Murabito & Hao LLP

[57] ABSTRACT

In a compiler for processing a software program and generating machine executable code, a method for optimizing a plurality of variables that have their addresses taken. The method is comprised of the steps of processing source code in a front end of the compiler, to determine a plurality of variables that have their addresses taken. The compiler then analyzes local calls for the plurality of variable that have their addresses taken and determines which local variables may be safely optimized. The compiler then analyzes global calls for the plurality of variables that have their addresses taken and determines which global variables may be safely optimized. The compiler then optimizes the code by moving the code containing local variables and global variables outside of the code loops in the software program.

16 Claims, 7 Drawing Sheets

FIGURE 1A
(Prior Art)

```
LOOP
    101    STORE VALUE INTO ADDR1
    102    LOAD VALUE FROM ADDR2 INTO REGISTER Y
    103    USE REGISTER Y
END LOOP
```

FIGURE 1B
(Prior Art)

```
111    LOAD VALUE FROM ADDR2 INTO REG Y
LOOP
    112    STORE VALUE INTO ADDR1
    113    USE REGISTER Y
END LOOP
```

FIGURE 1C
(Prior Art)

```
LOOP
    121    STORE VALUE INTO V
    122    LOAD P INTO REGISTER Y
    123    USE Y TO LOAD (*P) INTO REGISTER X
    124    USE REGISTER X...
END LOOP
``` void P2 ( int*Pk )

501
　...
　variable = *Pk;　⟶　indirect use of Pk　502
　...

IPA SUMMARY TABLE

END

FIGURE 5

601  void P3 ( void )                    IPA SUMMARY TABLE

{
     .........                           i address passed, <u>direct use</u> (normal)

602  extern int i, j, k ;                j address passed, <u>indirect ref</u>
     .........                           k address passed, <u>indirect ref</u>
603  P ( &i, &j, &k );
     .........
     }

FIGURE 6

APPARATUS AND METHOD FOR COMPILER IDENTIFICATION OF ADDRESS DATA

FIELD OF THE INVENTION

The field of the present invention pertains to computer software compilers. More particularly, the present invention relates to an apparatus and method for determining address data of memory references in software code by a software compiler.

BACKGROUND OF THE INVENTION

Computers are being used today to perform a wide variety of tasks. Many different areas of business, industry, government, education, entertainment, and most recently, the home, are tapping into the enormous and rapidly growing list of applications developed for today's increasingly powerful computer devices. Computers have also become a key technology for communicating ideas, data, and trends between and among business professionals. These devices have become so useful and ubiquitous, it would be hard to imagine today's society functioning without them.

Computers operate by executing programs, or a series of instructions stored in its memory. These programs, and their series of instructions, are collectively referred to as software. Software is key to utility of computers. Software is what makes the computer devices function and perform useful tasks. Good software makes for effective machines, while poor software makes for difficult to use, less effective machines. Thus, the utility of the computer device often hinges upon the utility of the software written for the device.

Software is written by professionals referred to as programmers or software engineers. As programs have become larger and more complex, the task of writing software has become correspondingly more difficult. As a result, programmers typically code in "high level languages" to improve productivity. The use of high level language makes the task of writing extremely long and complex programs more manageable. The completed program, however, must be translated into machine executable language in order to run on a computer. Programmers rely upon compilers to translate their program written in high level language into a program comprised of machine executable code, or, machine language.

Compiler efficiency and sophistication is directly related to the speed and reliability of the machine executable code. The process of translating the program written in high level language into a program written in machine language is referred to as compiling. The actual translation is performed by a software program referred to as a compiler. The compiler operates on the program written in high level language. The high level language program is referred to as source code. The compiler translates the source code into machine executable code. Ultimately, it is the machine executable code which will run on the computer. Thus the speed and reliability of the executable code depends upon the performance of the compiler. Where the compiler is inefficient, the size of the executable code will be larger than necessary. Other attributes, such as execution speed and reliability, may also be affected. Where the compiler lacks sophistication, many optimizations, or efficiency enhancing modifications, to the executable code will be lost. It is critical to the speed and efficiency of the program that the compiler thoroughly optimizes the executable code during the translation process.

The process of optimization, on a rudimentary level, often involves moving code from one location in the program to another location. Code is moved in order to enhance speed and efficiency. For example, the compiler may seek to place code in locations such that a particular calculation called for in the code can be performed once instead of perhaps hundreds, or even millions, of times. This could involve moving code for performing a calculation out of a program loop, as opposed to leaving it in where it must be performed each time the loop is executed.

In order to move code, the compiler must make sure the code relocation does not adversely affect other units of code which refer to or rely upon the code in some way. This is especially true for code comprising memory references. These memory references point to objects of code, i.e., data, that is in memory (e.g., load data, store data, and the like). The compiler must make sure not to move certain units of code, especially memory references, past other units of code which refer to the same memory locations. For example, a compiler would like to move a load of a variable located inside a loop, outside the loop. This would allow for the program to execute the load once, as opposed to as many times as the program executes the loop. There may be other stores inside the loop, so the compiler must insure any other store inside the loop does not go to the same memory location. Should a store go to the same memory location and the compiler move the load of the variable up in front of the store, the program would be erroneously loading an earlier version of whatever value was there instead of the version the program was looking for.

Referring now to FIGS. 1A, 1B, and 1C, an example of the above described optimization problem is shown. The figures collectively describe the example of moving a "load value" out of a loop. In FIG. 1A, the load value is inside of the code loop, line 101. To execute the code, the computer must execute the load instruction each time it processes through the loop. Depending upon the particular program implementation, the computer may execute the loop anywhere from perhaps a few dozen to millions of times. If the compiler could structure the program such that the load instruction is executed just once, outside of the loop, the loop will execute correspondingly faster. In FIG. 1B, the load instruction is moved outside the code loop, line 111. In this position, the load instruction is executed only once, before the loop. This saves the execution time of the load instruction each time the loop is executed.

The problem is that at program compile time, the typical compiler cannot tell whether Addr1 and Addr2 point to the same location in memory at program run time. If Addr1 and Addr2 do point to the same location, the program will be erroneously picking up an earlier version of the data pointed to by Addr2 111, in the manner described above. This could lead to incorrect program behavior.

In FIG. 1C, another version of this problem is illustrated. Here, V is a global variable. P is a pointer variable that contains an address. *P is the data contained in the memory location pointed to by P. Line 122 loads the value of P into register y. Line 107 loads into a register X, the data pointed to by P. Line 124 actually uses X, the data. As described above, the problem here is that at run time, the typical compiler cannot tell whether *P and V are the same memory, that is, whether P contains the address of V. The compiler does not really know what is in P. A good compiler may do some analysis, however, to figure out what the possibilities are. The compiler will scan the program to determine if V's address was ever taken (i.e. whether the program ever loaded the address of V). The compiler cannot generally determine whether the address contained in P, in particular, points to V or ever did point to V. The compiler can, however, determine whether V's address was ever taken. If V's address was ever taken, there's some potential V's address ended up in P. This is what the compiler must guard against while performing optimizations. If there is a possibility of P pointing to V, the load instruction 123 cannot be moved outside of the loop without possibly causing an error. If V's address cannot be in P, the compiler can proceed with the optimization and safely move the load instruction outside the loop.

This is the manner typical compilers deal with this problem. They scan all of the variables in the program to determine those that have ever had their addresses taken. They are candidates to have their addresses in pointers like P. None of these candidates are then optimized. Although this approach solves the problem of introducing errors into the executable code, it is extremely overly conservative. In FORTRAN in particular and in C to a lesser extent, when programs pass arguments (e.g., X) to subroutines, the compiler takes the address of X and places it into a register. That address is passed to the subroutine. This is often done in such a context that the program never uses the argument address in a way that it would be a problem with the above described optimization process. The simple minded approach of the typical compiler, (i.e. just scanning through the code and looking for variables that have their addresses taken), results in many lost optimization opportunities. The typical compiler will conclude that all of these variables that have their addresses taken can be pointed to by pointer variables. None of these variables will be optimized. This general problem of determining whether two memory references can lead to the same address or same memory location is called disambiguation.

A second, even more serious, aspect to the above described problem is where V is a global variable declared in such a way that it could come from another module or another file, or be otherwise externally visible. The compiler must always assume, in such instances, that V's address is taken. This is because the other file or module can take the same address. Therefore, the compiler must assume all such global data is always address-taken. Consequently, the disambiguation of memory references required by the optimization process is disabled when variables have had their addresses taken, and where variables are global or otherwise externally visible.

Thus, what is desired is a method to fully enable the disambiguation of memory references as required by the optimization process. The method should provide for the optimization of all variables where address-taken conditions would not induce errors. What is desired an apparatus and method for compiler identification of address data of variables such that those variables which cannot be optimized without inducing errors are particularly identified. The present invention provides a solution to the problems described above.

SUMMARY OF THE INVENTION

The field of the present invention pertains to computer software compilers. More particularly, the present invention relates to an apparatus and method for determining address data of memory references in software code by a software compiler. The compiler of the present invention provides for the disambiguation of memory references required by the optimization process. The compiler operates upon a software program written by programmers. The compiler front end processes the source code files and marks all the variables that have had their addresses taken. Address-taken cases can be optimized depending upon what operations the program actually performs with the addresses. The compiler analyzes the operations the program actually performs to determine which address-taken cases can be optimized.

Next, the inter-procedural local analysis phase of the compiler (IPL) analyzes all of the procedures and all of the local data references inside the procedures for each variable. The IPL determines what kind of references occur for each variable within the procedure. The IPL summarizes all these local cases. The inter-procedural analysis phase of the compiler (IPA) analyzes the variables globally across all procedures. IPA determines which variables have had their addresses taken and used in ways which inhibit optimization. IPA summarizes all these global cases. The summaries provide precise address-taken information about all variables even when the variables are global or otherwise externally visible.

The precise address-taken information generated by the compiler of the present invention thus aids the disambiguation of memory references. Those references which cannot be safely optimized are particularly identified. The references which can be optimized are relocated in the program code to enhance speed and efficiency. This allows the compiler to optimize the code as thoroughly as possible. The output of the compiler of the present invention is fully optimized, machine executable code.

BRIEF DESCRIPTION OF THE DRAWINGS

The present invention is illustrated by way of example and not by way of limitation, in the figures of the accompanying drawings and in which like reference numerals refer to similar elements and in which:

FIG. 1A shows an exemplary code loop.

FIG. 1B shows an exemplary code loop after optimization.

FIG. 1C shows an exemplary loop of code which contains a pointer difference and normal variable reference which might reference the same data.

FIG. 5 shows an example program subroutine and the corresponding inter-procedural analysis summary data generated by the present invention.

FIG. 6 shows an example program subroutine declaring global variables and the corresponding inter-procedural analysis summary data generated by the present invention.

DETAILED DESCRIPTION OF THE INVENTION

An apparatus and method for compiler identification of address data is disclosed. In the following description, for the purposes of explanation, numerous specific details are set forth in order to provide a thorough understanding of the present invention. It will be obvious, however, to one skilled in the art that the present invention may be practiced without these specific details. In other instances, well-known structures, devices, and processes are shown in block diagram form in order to avoid unnecessarily obscuring the present invention.

The present invention provides for the disambiguation of memory references required by the optimization process. The process of the present invention provides precise address-taken information for all variables. Using this information, compilers can proceed with the optimization process even when variables have had their addresses taken, and where variables are global or otherwise externally visible.

Figure 2:
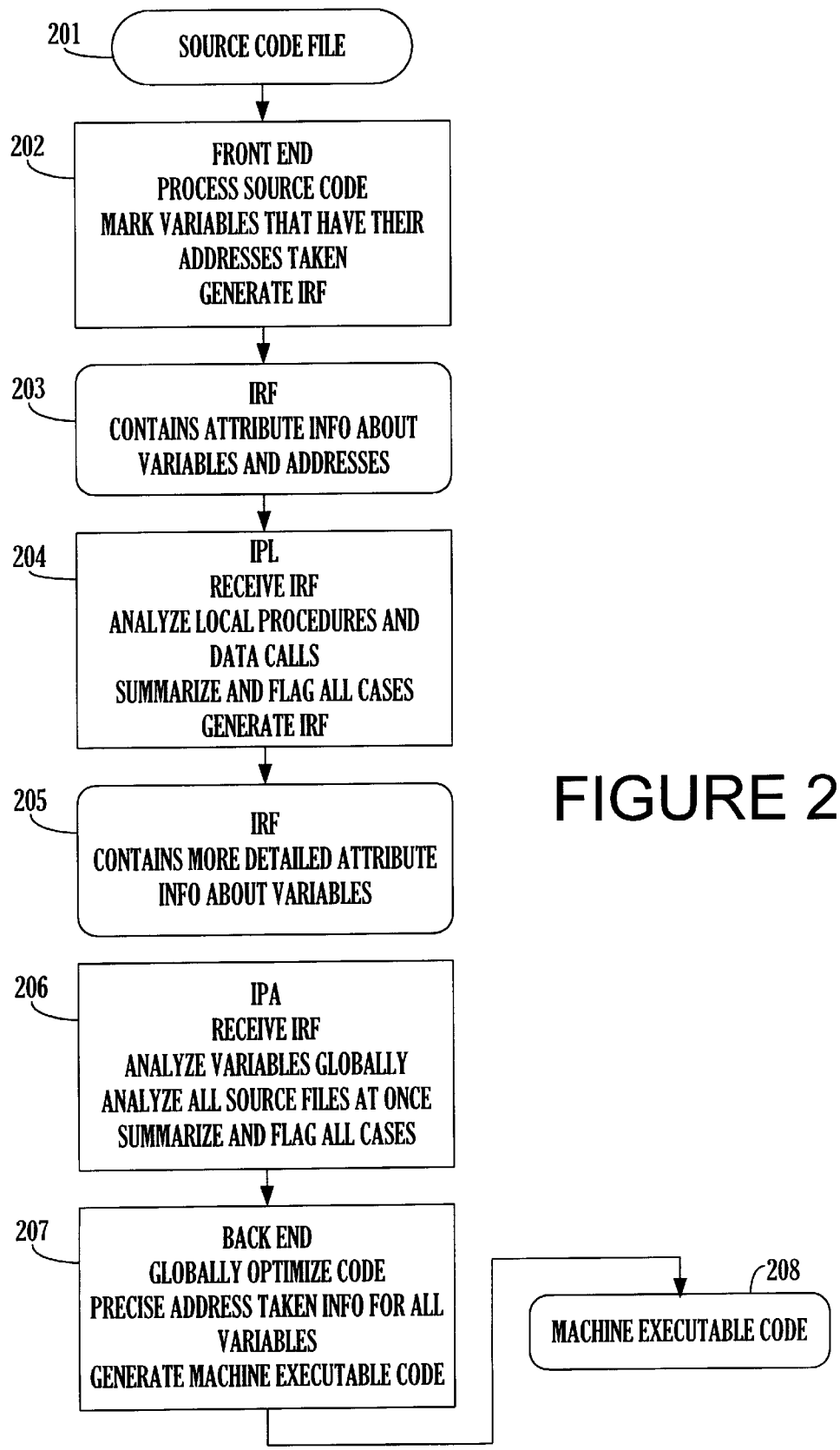
FIG. 2 shows a flow chart in accordance with the compilation process of the present invention.

With reference to FIG. 2, a compiler process in accordance with the present invention is shown. The compiler operates upon a software program written by programmers. The program consists of high level programming language in a source code file, step 201. The source code file contains all of the instructions of the program. The initial phase of the compiler is referred to as the "front end". The source code file is processed by the front end, in step 202. The front end processes the source code file and flags all the variables that have had their addresses taken. The variables are flagged in one of two ways, either the address-saved case or the address-passed case. The address-saved case is where the address of the variable is taken and is assigned to a pointer or some other operand. The address is then available for any argument in the program to use. The address-passed case is where the address is passed as a parameter to a subroutine. The address is then available for a subroutine to use. Except for the inter procedural analysis phase, all other parts of the compiler treat the two cases the same.

Address-saved cases cannot be optimized. Their addresses are used in such a manner that optimizing them in certain ways could induce errors in the program. Address passed cases can be optimized under certain conditions. These conditions mainly depend upon what operations the program actually performs with the addresses. The compiler of the present invention analyzes the address-passed cases. The compiler of the present invention determines the nature of the operations the program actually performs with the addresses. The ultimate objective is determining which of the address-passed cases must inhibit optimization and must, therefore, be treated like address-saved cases. The resulting code comes out of the front end in an intermediate representation format. This code is placed into a file, referred to as an intermediate representation file (IRF).

The IRF propagates its contents to the inter-procedural local summary phase, step 203. In the present embodiment, the IRF includes the information gathered about the variables. The IRF also contains the processed source code in an intermediate representation format. It also contains data on the variables, including variable address information and whether they are flagged as address-saved or address-passed.

The inter-procedural local summary (IPL) phase, step 204, analyzes the information propagated by the IRF. In the present embodiment, the IPL analyzes the IRF and analyzes all of the procedures contained therein. The IPL analyzes all of the procedures and all of the data references inside the procedures. This allows the IPL to properly compare and categorize all local references to the variable. For each subprogram, the IPL summarizes the characteristics of that subprogram's formal parameters (i.e. the operand of a procedure) and externally visible variables. For each formal parameter variable (hereafter formal) and global variable (hereafter global), the IPL determines whether it is directly or indirectly referenced. The IPL then determines whether the reference to the formal or global was a modification, or the reference was a use.

In accordance with the present embodiment, a direct reference refers to the case where the program reads the value of the variable and the value itself is the operand in an expression. A direct modification is case where the actual value of the variable is changed. A direct use is the case where the program takes the value and uses it as an operand in an expression. This would include. for example, assigning the value to a pointer. An indirect reference refers to the case where the variable's value is an address of another data object and the program uses the address value to access a data object and that data object is the operand in an expression. Thus, an indirect modification is the case where the data object the variable points to is modified. An indirect use is the case where the data object pointed to is used as the operand in an expression. The IPL summarizes and flags all these cases in an IPL summary table. All of this information is placed into the IRF along with the information previously there.

IRF propagates its contents to the inter-procedural analysis phase, step 205. The IRF contains the processed source code in an intermediate representation format. The IRF includes the additional data gathered about the variables in the IPL phase. The data includes information on the variables, including variable address taken information and whether they are flagged as direct modification, direct use, indirect modification, or indirect use.

The inter procedural analysis phase (IPA) analyzes the information propagated by the IRF, step 206. IPA analyses the variables globally across all procedures. In most cases, the IPA analyzes all the source files in the program at once. It pulls all variable data from the IRF. The IPA determines which variables must be treated as address-saved, inhibiting optimization as described above. The output of the IPA phase is precise address-taken information about all global variables and formal parameter variables.

In the global optimization phase, the back end of the compiler uses the precise address-taken information from the summary tables generated by IPL and IPA to optimize the code as thoroughly as possible, in step 207. The precise address-taken information generated by the IPL phase and the IPA phase of the present invention have provided for the full disambiguation of the memory references (variables, parameters, and the like). The references which cannot be optimized without inducing errors are particularly identified. The compiler can then optimize other references, for example, by moving them outside of loops. In doing so, the code is enhanced in speed and efficiency. The output of this step is fully optimized, machine executable code, in step 208. The IPA phase of the present invention will now be described in detail below.

Figure 3:
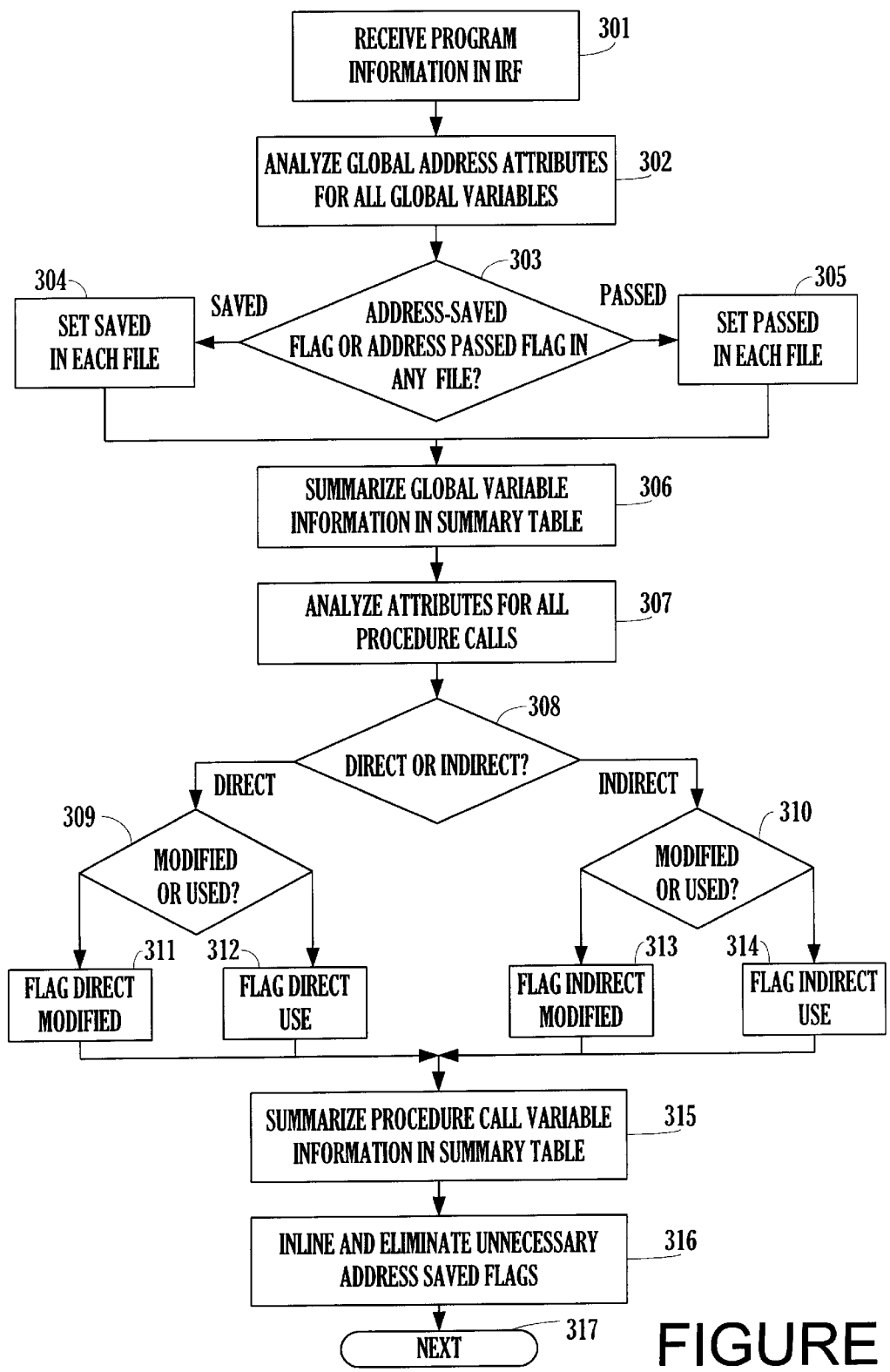
FIG. 3 shows a flow chart of the Inter-Procedural Analysis phase of the present invention.

With reference now to FIG. 3, a flow chart describing the IPA phase of the present invention is shown. This flow chart shows the IPA phase in greater detail. The IPA phase of the compiler receives the program information present in the IRF, step 301. The compiler analyzes the address-taken attributes for all global variables, in step 302. For each global variable, the compiler analyzes those address-taken flags that are set for them in each of the global files. If the address-saved flag is set in any of them it gets set in each of them, steps 303 304. If the address-passed flag is set in any of the files, it gets set in each of them, steps 303 305. In the present embodiment, all of this information is summarized in an IPA summary table, step 306. At this point, the remaining phases of the compiler no longer have to assume the addresses of the global variables are taken. The address-taken flags of the global variables can each be examined to determine the actual address-taken condition the corresponding global variable.

It is preferable that IPA analyze all procedures of a program. However, IPA is able to deal with messing procedures as follows: If the missing parts of the program are in separately linked components called dynamic shared objects (DSOs), it is possible that later changes to the DSO might introduce new references. Therefore, the compiler searches for references to global variables in a DSO's symbol table. IF references are found, it must assume that the DSO might save the global variable's address (whether the current DSO saves the global variable's address or not), and mark it address-saved. However, if references to a global variable are not found in the current DSO version, the global variable's status in the current compilation is changed to "hidden" (meaning it may not be referenced by name outside the program component being built), and therefore even a later changed version of the DSO cannot access it directly.

If the missing parts of the program are in relocatable object files, i.e., parts of the program which have already been compiled and will be linked with the program part currently being compiled, the compiler must check for reference information in the relocatable object file's symbol table and mark a global variable address-taken if there is a reference. Unlike the DSO case, it is not necessary to change the variable's status to hidden if there is no reference because the relocatable object file cannot be replaced later without rebuilding the current program part.

The compiler now analyzes the address attributes for all of the procedure calls in the program, step 307. For each procedure, the compiler analyzes the operations performed by the procedure and by any other procedures which it calls. It analyzes the actual parameters passed and determines whether any of them are the addresses or values of global variables or formal parameter variables (formals). The compiler now analyzes every call that passes an address or a formal which might contain an address, and in particular, how that address is used or modified in the called procedure. In step 308, each of these calls is examined to determine whether there is a direct or indirect reference to the corresponding formal parameter in the called procedure. If the called procedure cannot be analyzed, either because it cannot be identified, or because IPL summary information is not available (e.g., in the DSO and relocatable object file cases), any variable passed by address must be flagged address-saved by value and any formal passed must be flagged directly referenced. In steps 309 and 310, the compiler determines whether the direct or indirect reference is a modification or use. The compiler flags the variables correspondingly, steps 311, 312, 313, 314, to reflect each case. The compiler then summarizes this information in the IPA summary table, step 315.

After analyzing the effects of procedure calls on the address-taken information, IPA performs "inlining," which may change some of the information. "Inlining" involves combining the body of code represented by a procedure called with the code of the procedure which called it, step 316. Inlining a procedure sometimes involves copying a passed variable address (e.g., "&x", the address of the variable x) to a temporary variable created to represent the called procedure's parameter. This copy itself involves saving the address in a pointer, so the variable x must be marked address-saved even though the original body of the called procedure never saved it.

After the IPA address-saved analysis and the final adjustments during inlining, none of the remaining address-passed flags represent potential address-saved situations, so they may be cleared. Only address-saved flags remain, and they constitute a precise summary of the true address-saved information for all variables.

At the conclusion of IPA, the compiler invokes its next phase, step 317, and in turn, step 207 of FIG. 2. The precise address-taken information is processed by the back end of the compiler. At this point, when the global optimizer in the back end encounters a variable reference and an indirect pointer reference, it can tell accurately whether the variable has had its address taken and saved, and therefore whether the pointer may possibly be pointing to it. If so, the global optimizer will avoid optimization which changes the relative ordering of the references; otherwise it is free to perform such optimizations. These cases are illustrated in the examples described below.

Figure 4:
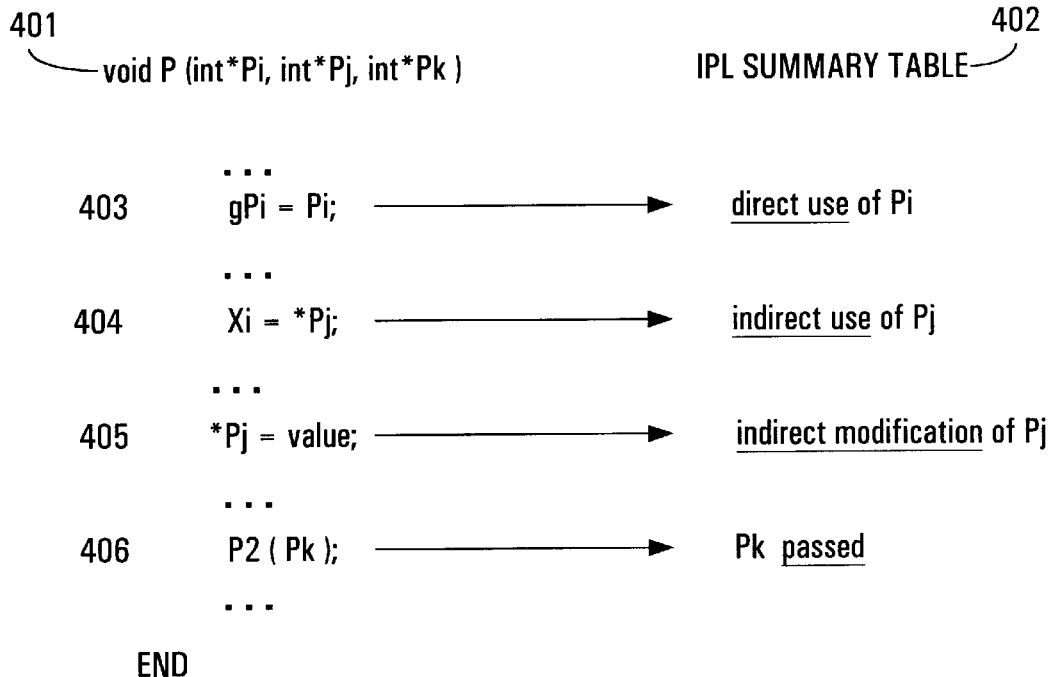
FIG. 4 shows an example program subroutine and the corresponding inter-procedural local summary data generated by the present invention.

With reference now to FIG. 4, an example "C" pseudo-code subroutine and the corresponding IPL summary table is shown. The subroutine is processed by the front end of the compiler. The front end marks variables that have their addresses taken and generates an IRF. The subroutine P of the present example declares three formal parameter variables, Pi, Pj, and Pk, each of which is a pointer to some data object, in line 401. IPL analyzes the variables and generates a corresponding summary table of their attributes 402. In line 403, Pi is assigned to a variable, thus Pi is flagged direct use. In line 404, the object Pj points to is assigned to a variable, thus Pj is flagged indirect use. In line 405, a value is assigned to the object Pj points to, thus Pj here is flagged indirect modification. In line 406, Pk is passed to the subroutine P2 as a variable, thus Pk is flagged address-passed. The IPL summary table thus reveals the indirect uses and modifications of the variables Pi, Pj, and Pk. When all uses of a variable's address are indirect, the compiler can safely conclude that the variable's address is not saved and optimize that variable. Subroutine P does not inhibit optimization of the object pointed to by Pj (i.e. it does not cause its address to be saved), but it does save the address of the object pointed to by Pi. IPL cannot resolve Pk since it is passed as a variable to the subroutine P2. Pk's address taken data must be determined by IPA.

With reference now to FIG. 5, the subroutine to which Pk is passed is shown. IPA assesses all procedure calls across all procedures in the program. In this example subroutine, a variable is assigned the value of the object Pk points to, in line 501. IPL flags Pk as indirect use in the IPA summary, 502. By analyzing the call from P to P2, IPA can also flag Pk as an indirect use in P, so P does not inhibit optimization of the object it points to by saving its address. Thus, IPA determines the address taken data of variables that are passed between subroutines. The compiler can safely optimize the object pointed to by Pk.

Referring now to FIG. 6, an example subroutine P3 601 declares three global variables i, j, k 602. IPA assesses all global variables in the entire program. IPA analyzes subroutine P3 and all other subroutines which reference i, j, or k. From the earlier analysis of subroutines P (FIG. 4) and P2 (FIG. 5), it determines that the call to P 603 contains a direct use of &i, but only indirect references to &j and &k. As a result, the compiler can optimize j and k.

Thus, the compiler of the present invention provides for the disambiguation of memory references required by the optimization process. The present invention provides precise address-taken and address-saved information which allows the optimization of all variables where address-taken conditions would not induce errors. Those cases where optimization would cause errors are particularly identified. Compilers in accordance with the present invention are thus able to produce correspondingly faster and more efficient machine executable code.

Figure 7:
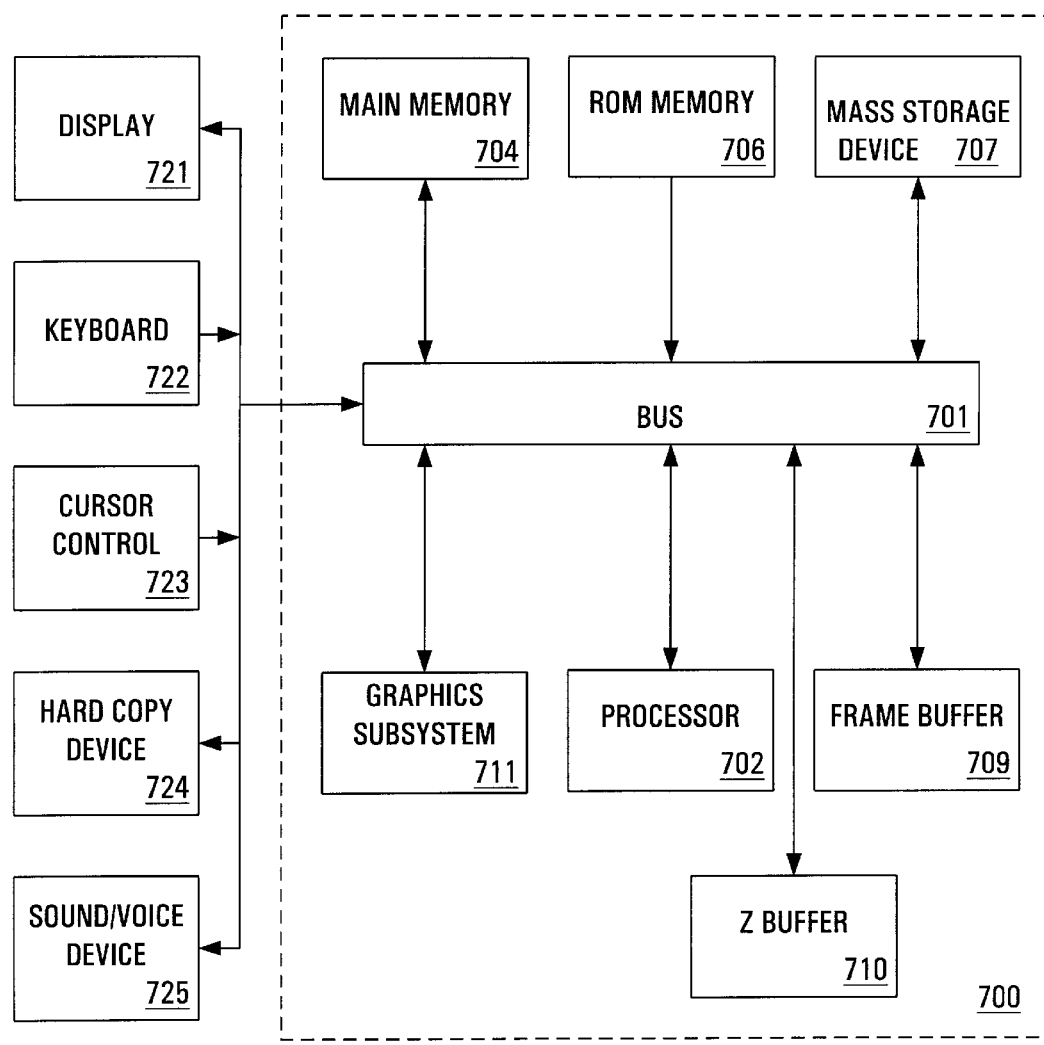
FIG. 7 shows a logical block diagram of a computer system upon which the present invention can operate.

With reference to FIG. 7, a computer system upon which the compiler of the present invention may be practiced is shown as 700. The compiler of the present invention exists as a set of instructions in a computer readable memory (a software program). The set of instructions, when executed on the computer system 700, cause the computer system 700 to perform the steps of the method of the present invention. System 700 includes any computer controlled graphics systems for generating complex or 3 dimensional images. Computer system 700 includes a bus 701 for transmitting digital information between the various parts of the computer system. One or more microprocessors 702 are coupled to bus 701 for processing information. The information along with the instructions of how the information is to be processed are stored in a hierarchical memory system comprised of mass storage device 707, read only memory 706, main memory 704, and static random access memory (SRAM) 703. Mass storage device 707 is used to store vast amounts of digital data. The mass storage device 707 can consist one or more hard disk drives, floppy disk drives, optical disk drives, tape drives, CD ROM drives, or any number of other types of storage devices having media for storing data digitally. A read only memory (ROM) 706 is used to store digital data of a permanent basis, such as instructions for the microprocessors. Main memory 704 is used for storing digital data on an intermediate basis. Main memory 704 can be dynamic random access memory (DRAM). Any of the hierarchical memory system, comprised of mass storage device 703, 704, 706, and 707, may comprise the computer readable memory of the present invention.

Several other devices may also be coupled to system 700. For example, an alphanumeric keyboard 722 is used for inputting commands and other information to processor 702. Another type of user input device is cursor control device 723 (a mouse, trackball, joystick, and the like) used for positioning a movable cursor and selecting objects on a computer screen. Another device which may be coupled to bus 701 is a hard copy device 724 (e.g., a laser printer) for printing data or other information onto a tangible medium.

What is claimed is:

1. In a computer system for executing computer readable code, a computer implemented method for determining precise address-taken information for a global variable of a software program stored within the computer system, the method comprising the computer system performing the steps of:
   a) processing source code of a software program to determine a global variable that has its address taken;
   b) analyzing a procedure to determine a corresponding first summary of address-taken data for a variable referenced in said procedure by:
      b1) determining whether a formal parameter is directly referenced or is a modification;
      b2) determining whether the direct parameter reference is a use;
      b3) determining whether the formal parameter is indirectly referenced;
      b4) determining whether an indirect parameter reference is a modification;
      b5) determining whether the indirect parameter reference is a use; and
      b6) generating a first summary, wherein the first summary includes local formal parameter flag information from the determinations of steps b1) through b5);
   c) analyzing a plurality of explicit references to the global variable to determine a corresponding second summary of address-taken data by:
      c1) determining whether the global variable is flagged address-saved;
      c2) if the global variable is flagged address-saved, flagging the global variable as address-saved in a plurality of files containing the global variable;
      c3) determining whether the global variable is flagged address-passed;
      c4) if the global variable is flagged address-passed, flagging the global variable as address-passed in the plurality of files containing the global variable; and
      c5) generating a second summary, wherein the second summary includes global variable flag information from the determinations of steps c1 through c4);
   d) combining the first summary and the second summary to obtain a precise summary of address-taken information for the global variable; and
   e) compiling the software program using the precise summary of address taken information to generate machine readable code.

2. The method of claim 1, wherein the step b) further includes:
   analyzing a procedure in the software program;
   analyzing a local data reference inside the procedure in order to categorize the local data reference to the global variable.

3. The method of claim 1 wherein the step c) further includes:
   analyzing a plurality of explicit references to the global variable across a plurality of procedures in the software program;
   analyzing a plurality of source files of the software program simultaneously, in order to categorize a reference to the global variable.

4. The method of claim 1, wherein the step of determining a second summary of address-taken data further includes:
   analyzing a plurality of relocations in a relocatable object file to identify a referenced global variable, wherein the nature of the referenced global variable cannot be identified precisely; and
   marking the referenced global variable as address-saved.

5. The method of claim 1, wherein the step of determining a second summary of address-taken data further includes:
   analyzing a plurality of relocations in a dynamic shared object file to identify a referenced global variable, wherein the nature of the referenced global variable cannot be identified precisely;
   marking the referenced global variable as address saved; and
   marking a non-referenced global variable in the dynamic shared object file as hidden to prevent a reference to the non-referenced global variable in a replacement dynamic shared object file.

6. The method of claim 1 wherein step d) further includes the steps of:
   analyzing attributes of the procedure call to which an address of the global variable has been passed;
   determining whether a corresponding formal parameter of a called procedure is directly referenced;
   determining whether the directly referenced parameter is used, wherein the global variable is flagged as address saved; and
   marking the global variable as address saved if the procedure to which the address of the global variable is being passed cannot be identified or cannot be analyzed.

7. The method of claim 1, wherein the step of combining the first summary and the second summary to obtain a precise summary of address-taken information for the global variable further includes the steps of:

generating the precise summary including local parameter flag information from the first summary and global parameter flag information from the second summary;

incorporating additional address saved information necessitated by inlining the software program; and eliminating the unnecessary address-passed flag information from the precise summary, to leave only precise address-taken information in the precise summary.

8. In a computer system having a processor coupled to a memory, the memory storing computer readable code which when executed by the processor cause the computer system to implement a compiler for processing a software program and generating machine executable code there from, wherein the compiler implements a method for determining precise address-taken information for a local variable of the software program, the method comprising the steps of:

a) processing source code of a procedure of a software program to determine a local variable that has its address taken;

b) analyzing the procedure to categorize a references to the local variable;

c) determining a corresponding summary of address taken data by:

c1) determining whether a formal parameter is directly referenced;

c2) determining whether a direct parameter reference is a modification;

c3) determining whether the direct parameter reference is a use;

c4) determining whether the formal parameter is indirectly referenced;

c5) determining whether an indirect parameter reference is a modification;

c6) determining whether the indirect parameter reference is a use; and c7) generating a summary, wherein the summary includes local formal parameter flag information from the determinations of steps c1) through c6);

d) analyzing the summary to obtain a precise summary of address taken information for the local variable; and e) compiling the software program using the precise summary of address taken information to generate machine readable code.

9. The method of claim 8, wherein the step b) further includes:

analyzing a procedure in the software program;

analyzing a local data reference inside the procedure in order to categorize the local data reference to the local variable.

10. The method of claim 8 wherein step d) further includes the steps of:

analyzing attributes of the procedure call to which an address of the local variable has been passed;

determining whether a corresponding formal parameter of a called procedure is directly referenced;

determining whether the directly referenced parameter is used, wherein the local variable is flagged as address saved; and marking the local variable as address saved if the procedure to which the address of the local variable is being passed cannot be identified or cannot be analyzed.

11. The method of claim 8, wherein step d) further includes:

generating the precise summary including local variable flag information from the summary;

incorporating additional address saved information necessitated by inlining the software program; and eliminating the unnecessary address-passed flag information from the precise summary, to leave only precise address-taken information in the precise summary.

12. In a computer system having a processor coupled to a memory, the memory storing computer readable code which when executed by the processor cause the computer system to implement a compiler for processing a software program and generating machine executable code there from, wherein the compiler implements a method for determining precise address-taken information for a formal parameter variable, the method comprising the steps of:

a) processing source code of a procedure in a software program to determine a formal parameter variable that has its address taken;

b) analyzing the procedure in the software program to categorize a reference to a data variable in the procedure;

c) determining a corresponding summary of address-taken data by:

c1) determining whether a formal parameter is directly referenced;

c2) determining whether a direct parameter reference is a modification;

c3) determining whether the direct parameter reference is a use;

c4) determining whether the formal parameter is indirectly referenced;

c5) determining whether an indirect parameter reference is a modification;

c6) determining whether the indirect parameter reference is a use; and c7) generating a summary, wherein the summary includes local formal parameter flag information from the determinations of steps c1) through c6);

d) analyzing the summary to obtain a precise summary of address taken information for the formal parameter variable; and e) compiling the software program using the precise summary of address taken information to generate machine readable code.

13. The method of claim 12, wherein the step b) further includes:

analyzing a formal parameter variable reference inside the procedure in order to categorize a local data reference to the formal parameter variable.

14. The method of claim 12 wherein the step b) further includes:

analyzing a plurality of explicit references to the formal parameter variable across a plurality of procedures in the software program;

analyzing a plurality of source files of the software program simultaneously, in order to categorize a reference to the formal parameter variable.

15. The method of claim 12 wherein step d) further includes the steps of:

analyzing attributes of the procedure call to which an address of the formal parameter variable has been passed;

determining whether a corresponding formal parameter of a called procedure is directly referenced;

determining whether the directly referenced parameter is used, wherein the formal parameter variable is flagged as address saved; and marking the formal parameter variable as address saved if the procedure to which the address of the formal parameter variable is being passed cannot be identified or cannot be analyzed.

16. The method of claim 12, wherein step d) further includes the steps of:

generating the precise summary including local parameter flag information from the first summary and global parameter flag information from the second summary;

incorporating additional address saved information necessitated by inlining the software program; and eliminating the unnecessary address-passed flag information from the precise summary, to leave only precise address-taken information in the precise summary.

* * * * *